United States Patent Office 3,142,579
Patented July 28, 1964

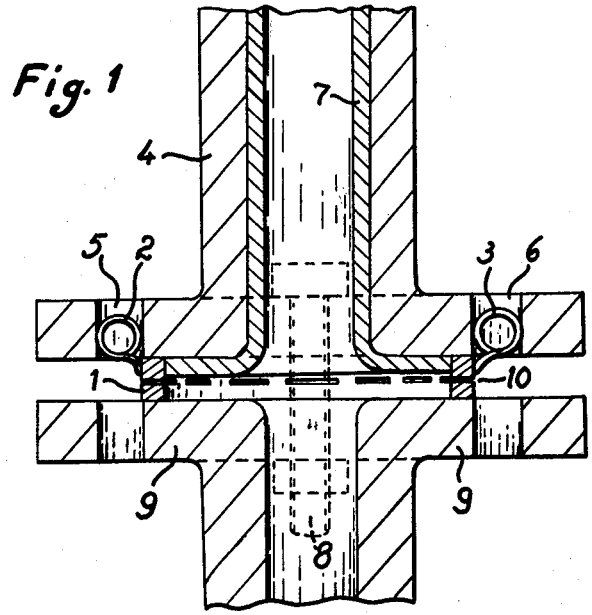
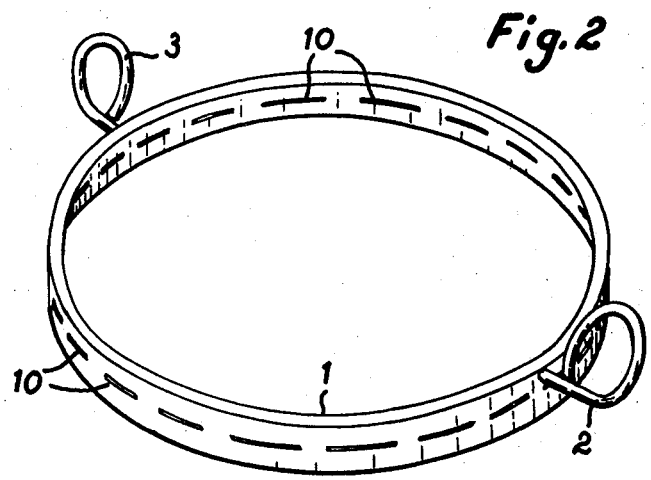

3,142,579
INTERNAL COATING OF FLANGED HOLLOW BODIES
Donald Herbert Brooks, District Vanderbijl Park, Transvaal, Republic of South Africa, assignor, by mesne assignments, to Engelhard-Hanovia, Inc., a corporation of New Jersey
Filed Jan. 24, 1961, Ser. No. 84,627
Claims priority, application Republic of South Africa Feb. 5, 1960
8 Claims. (Cl. 117—18)

The present invention relates to improvements in the internal coating of flanged hollow bodies, e.g., pipes, more particularly with coatings of thermoplastic materials.

A method for internally coating pipes by means of aerated thermoplastic powders is known in which the heated pipe is bolted or clamped to an aerating or fluidising vessel from which an aerated thermoplastic powder is transported into the heated pipe and kept in contact therewith until an adequate thickness of powder has adhered to the pipe.

For this purpose the pipe is normally mounted on top of the said aerating vessel and a funnel-like structure is normally mounted on top of the upper end of the said pipe to collect the overflow of coating powder transported upwards from the aerating vessel into the pipe. This funnel or the like is similarly bolted or clamped, and although it is substantially separated from the aerating vessel by the said length of piping, it is still to be regarded as part of the coating apparatus.

According to a more particular method as disclosed in co-pending corresponding patent applications Serial Nos. 846,376, filed October 14, 1954, 846,375 filed October 14, 1959, now abandoned, and 806,931, filed April 16, 1959, the aerated particulate coating material inside the aerating vessel is displaced in bulk into the pipe to be coated and maintained inside the pipe or other hollow body to be internally coated for a short period, during at least a substantial part of which the particulate material is in a state of aeration intermediate between that of a fluidised bed and the loosely settled powder.

When internally coating flanged hollow bodies, e.g., pipes, the difficulty may be experienced that the flanges of said pipes are either not coated sufficiently or that they are covered to such an extent that the bolt holes of the flanges are also covered and consequently clogged. A further difficulty encountered in this coating method is that the flanges of the apparatus engaging the flanges of the pipe to be coated, become heated as a result of the coating process, causing the thermoplastic coating material to adhere to the flanges of the apparatus and to become stringy when the flanges are separated.

It is the object of the present invention to provide a process and means which will eliminate the abovementioned disadvantages and to provide an even coating on the flanges which extends almost as far as the bolt holes or as far as desired or required.

It is a further object of the invention to prevent the flanges of the coating apparatus from becoming heated to any great extent as a result of being in contact with the flanges to be coated.

Further objects, advantages and applications of the invention will become apparent from the following description:

In accordance with the invention, the improvement in the internal coating of flanged hollow bodies, in particular pipes comprises the provision of a ring which is inserted coaxially as a spacer between the flange to be coated and the corresponding flange of the coating apparatus, said spacing ring, having an internal diameter corresponding to the internal diameter of the pipe plus the portion of flange to be coated. The spacer normally has an internal diameter such that, when said spacer is concentrically placed on the flange to be coated, it extends almost up to the bolt holes of the flange to be coated.

In one embodiment the spacer comprises a ring of the order of ¼" high and ⅛" thick and having the desired diameter, but the invention is naturally not confined to these dimensions.

A spacer in accordance with the invention, suitable for the process, comprises the means specified above and is furthermore provided with means for securing it to either the flange to be coated or the corresponding flange of the apparatus. In one embodiment the securing means take the form of springs, e.g., two springs, suitably attached to the outside of the spacer ring, said springs being evenly distributed around the periphery of the said ring and preferably adapted to engage corresponding bolt holes in the said flange.

The above mentioned spacer is of very simple construction and can be temporarily displaced by another spacer whenever the temperature of the spacer rises too much. A preferred embodiment of the spacer, however, is provided with additional cooling. For this purpose the spacer may be hollow to allow the circulation of cooling water therethrough. Because such cooling takes care of any undue heating of the spacer, such a cooled embodiment of the spacer may be permanently affixed to or incorporated in the said flange of the coating apparatus. When it is desired to change the dimensions of pipes and particularly pipe flanges to be coated on a particular apparatus from time to time it is also possible to install the said cooled spacer in an interchangeable manner, e.g., by bolting.

A satisfactory connection between the spacer and the flange of the hollow body to be coated may be established by the provision of flange location pins on the pipe flange-engaging side of the spacer and a pipe flange-engaging clamp forming part of the coating apparatus, which presses the pipe flange against the said spacer. Such clamp may, for example, comprise a hinged two-pronged member, said prongs serving to engage the pipe or like flange and a clamp actuating mechanism, e.g., a connecting rod actuated by a pneumatic or hydraulic plunger.

A further problem which is sometimes encountered when coating pipes in accordance with my said patent application Serial Nos. 846,376, 846,375 and 806,931 consists of the accumulation of excess coating powder on the flange surface, since the flanged surface is not subjected to the wiping action of the powder bed moving along the walls of the pipe. This difficulty may easily be overcome in accordance with the invention by blowing air over the said flange, preferably in sharp bursts, to blow off the said excess powder. For this purpose the said spacer may be provided with one or more suitable air ports or slots. Said air ports or slots are preferably so dimensioned that substantially no powder particles can escape therethrough to the outside.

In the type of operation in which subsequent to the contacting of the pipe interior with the powder, the powder is drawn back into the aerating vessel by expanding the volume of the aerating vessel, the resulting suction may be utilised for drawing atmospheric air through the said slots or ports. In other cases it is preferred to blow compressed air through the said one or more slots or ports.

For the last-mentioned purpose the said spacer may comprise an annular passage for compressed air or gas in communication with the said one or more slots or ports.

The invention and the manner in which it may be put into practice will be further described with reference to the accompanying drawings without thereby limiting the scope of the invention.

In the drawings:

FIG. 1 illustrates a vertical-sectional view of an internally coated flanged pipe still connected to the coating apparatus and having a spacer ring in position in the manner according to the invention;

FIG. 2 is an isometric projection of the spacer ring shown in FIG. 1;

Figure 3:
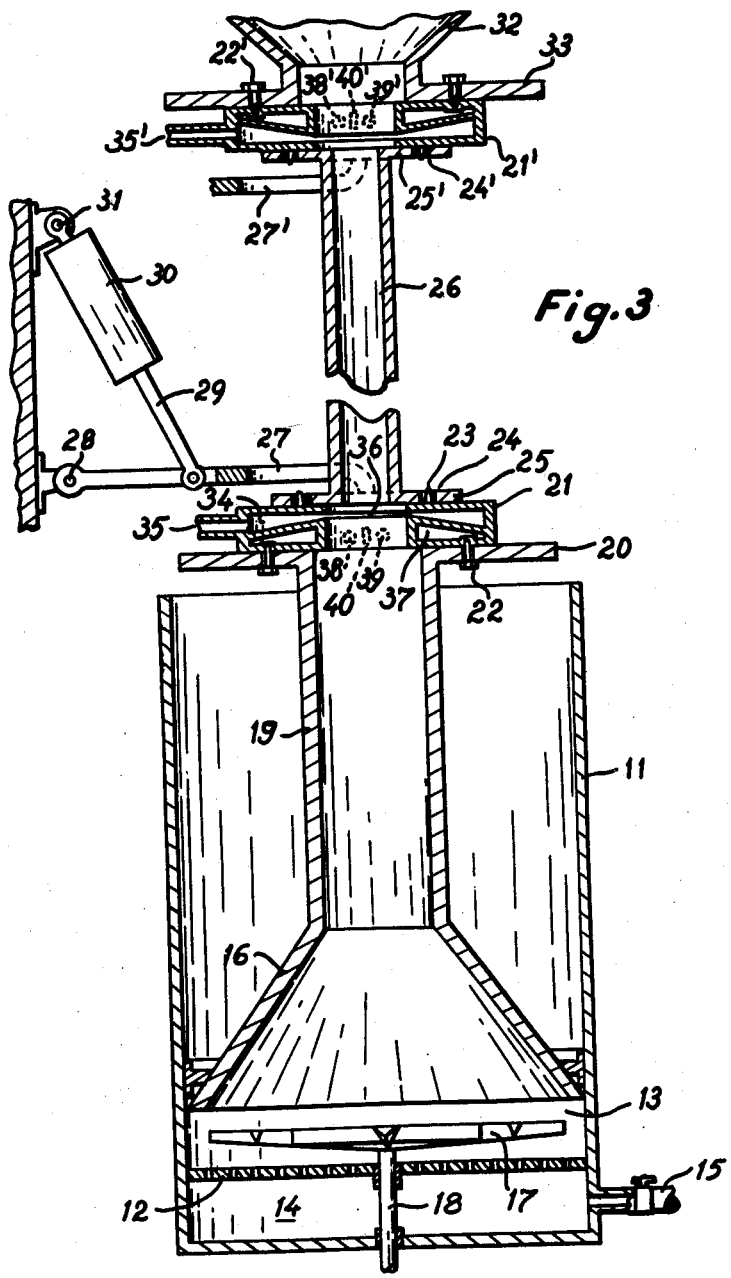
FIG. 3 represents a vertical section through a coating apparatus for internally coating pipes, illustrating an alternative form of the spacer in accordance with the invention in a preferred mode of application.

Referring to FIGS. 1 and 2 of the drawings:

The spacer ring 1 with the securing springs 2, 3 is placed onto the flanged pipe 4 as shown in FIG. 1 so that the springs 2 and 3 are positioned within the bolt holes 6 and 5, thereby securing said spacer ring. Bolts 8 are passed through the remaining bolt holes for the purpose of securing the flanged pipe 4 to the corresponding flange 9 of the lower portion of the coating apparatus.

The ring 1 is provided all around with very narrow slots or ports 10.

The said lower portion of the coating apparatus is of the same type as illustrated in FIG. 3 which will be described in detail further below.

The coating process is carried out in a manner described in greater detail further below with reference to FIG. 3. The particulate coating material is displaced upwards into the pipe 4 which has been pre-heated for the purpose. After a suitable contact period, say about 5 seconds, an adequate amount of coating material has fused onto the inside of pipe 4 including the flange up to the limitation provided by ring 1. After this contact period, the powder inside pipe 4 is sucked back into the aerating vessel of the lower part of the apparatus. This suction causes blasts of air through the ports 10 to blow excess powder off the pipe flange. A neat inner coating 7 is produced. The coating process completed, the bolts are removed and the flanged pipe 4 lifted from the support flange or the like. The spacer ring 1 is then removed after the resin has hardened and the operation is complete.

The invention naturally includes the case where the spacer ring or the like is secured to the support flange or the like, i.e. in the opposite manner to that shown in the drawing.

The arrangement shown in FIG. 1 is repeated in upside down fashion at the upper end of pipe 4 where the place of flange 9 is taken by a similar flange at the lower end of a funnel-like structure of the type shown in FIG. 3.

The spacer is normally of metal and is treated with a release agent known per se before use.

Referring now to FIG. 3, the pipe coating plant comprises an aerating vessel 11 comprising a perforated bottom plate 12 separating the aerating space 13 from the gas box 14 provided with a gas inlet 15. The top of the aerating vessel is afforded by an inverted funnel-like structure 16 movable up and down inside the aerating vessel in a piston-like manner.

A gridlike shuffler 17 is similarly vertically movable inside the aerating space 13 when motivated by the connecting rod 18, and serves for breaking up lumps of particulate coating material when necessary.

The stem 19 of the funnel-shaped structure 16 is provided at its upper end with a flange 20 of substantial width. This flange 20 carries an interchangeable spacer member 21. This spacer member 21 is chosen in accordance with the dimensions of the pipe being coated and its inner diameter may be larger or smaller than the inner diameter of the funnel stem 19. At its underside, the spacer member 21 is bolted by means of bolts 22 to the said flange 20. At its upperside the spacing member is provided with flange location pins 23 adapted to engage corresponding bolt holes 24 in the flange 25 of a pipe 26 being coated. The assembly is clamped together by means of a two-pronged clamp 27, the foremost prong being cut away in the drawing, hinged at 28 to a support (not shown) in rigid relationship to the funnel-shaped structure 16, 19 of the apparatus. The prongs are pressed down by a connecting rod 29 actuated by a pneumatically or hydraulically operated piston and cylinder combination 30 hinged to the said rigid support at 31.

A funnel-like structure 32 is mounted to the top flange 25' of pipe 26 by means of its corresponding lower flange 33 in a manner which will be obvious from the aforegoing, corresponding members being indicated by corresponding but primed reference numbers.

The spacer member 21 differs slightly from the spacer member 1 shown in FIGS. 1 and 2. It comprises an annular passage 34 with a gas inlet for compressed gas 35 which communicates with the inside of the pipe coating apparatus near flange 25 with a very narrow annular slot 36, so dimensioned that the coating material will normally not enter therethrough. Coating material which inadvertently enters passage 34 will be blown back into the coating apparatus through slot 36 whenever a burst of compressed gas is applied. Adjoining the passage 34 is a second annular passage 37. Cooling water is circulated through this annular passage by means of suitable water inlets and outlets 38 and 39 respectively, separated by a baffle 40.

The coating process proceeds as follows:

The pipe 26 is pre-heated and installed in the apparatus in the manner indicated. Particulate thermoplastic material is maintained in a fluidised condition in the aerating space 13 while the aerating vessel 11 is in a lowered position with respect to the funnel-shaped structure 16, 19. If necessary the plunger 17 is rapidly moved upwards and slowly lowered again to break up any lumps in the coating material. The aerating vessel 11 is then rapidly pushed upwards by means not shown in the drawing while the remainder of the assembly remains stationary, whereby the bulk of the aerated particulate material is displaced upwards into the funnel-shaped structure 16, 19 and into pipe 26 right up to the funnel-shaped structure 32. The increased pressure head immediately causes a partial collapse of the powder mass, which then cannot be described as a fluidised bed any more, since the whirling motion of the individual particles has ceased. The powder is nevertheless in a state of high aeration and very mobile. During the sojourn of the powder inside the pipe the degree of aeration gradually diminishes resulting in a shrinkage of the volume of the powder mass and a gradual downward movement of the powder mass in the direction of the aerating vessel. This movement results in a wiping action having a beneficial result on the coating being formed inside the pipe from thermoplastic fusing to the inner periphery of the pipe. After approx. 5 seconds (the exact time depending on the coating thickness desired) the aerating vessel is lowered rapidly and the resulting expansion of the aerating space causes the rapid withdrawal of the powder from pipe 26. Excess powder beyond that required for the coating remaining on flanges 25 and 25' is then blown off by applying a rapid burst of compressed air to air inlet pipes 35 and 35' respectively.

Pipe 26 is then removed from the assembly and replaced by a further pre-heated pipe.

Although the invention has been described mainly with reference to the inner coating of pipes it is obvious that the principle taught by this specification may similarly be applied to the inner lining of other flanged hollow bodies in a manner which will be obvious to those skilled in the art.

What I claim is:

1. In a process for internally coating terminally flanged hollow bodies of the type in which the heated hollow body is secured to an aerating vessel from which an aerated thermoplastic powder is transported into the heated body and kept in contact therewith until an adequate thickness of powder has adhered to the hollow body, the improvement which comprises inserting coaxially a ring as a spacer and stencil between the flange to be coated and the coating apparatus, said spacer ring having an internal diameter corresponding to the internal diameter of the body plus the portion of the flange to be coated, and which improvement further comprises blowing excess powder off the flange of the hollow body being coated by blowing air through at least one aperture provided in the said spacing ring.

2. A process as claimed in claim 1 in which subsequent to the contacting of the body interior with the powder, the powder is drawn back into the aerating vessel by expanding the volume of the aerating vessel and the resulting suction is utilised for drawing atmospheric air through the said aperture.

3. A process as claimed in claim 1 in which compressed air is blown through the said aperture.

4. In an apparatus for internally coating flanged hollow bodies of the type in which the heated hollow body is bolted or clamped to an aerating or fluidising vessel from which an aerated thermoplastic powder is transported into the heated body and kept in contact therewith until an adequate thickness of powder has adhered to the hollow body, the improvement which comprises the provision of a ring which is inserted coaxially as a spacer and stencil between the flange to be coated and the corresponding flange of the coating apparatus, said spacer ring having an internal diameter corresponding to the internal diameter of the body plus the portion of the flange to be coated, said ring being provided with flange location pins on the pipe flange engaging side of the spacer and the further provision of a pipe flange engaging clamp forming part of the coating apparatus, which presses the pipe flange against the said spacer.

5. The improved apparatus as claimed in claim 4 in which the clamp comprises a hinged two-pronged member, said prongs serving to engage the pipe or like flange and a clamp actuating mechanism.

6. In an apparatus for internally coating flanged hollow bodies of the type in which the heated hollow body is bolted or clamped to an aerating or fluidising vessel from which an aerated thermoplastic powder is transported into the heated body and kept in contact therewith until an adequate thickness of powder has adhered to the hollow body, the improvement which comprises the provision of a ring which is inserted coaxially as a spacer and stencil between the flange to be coated and the corresponding flange of the coating apparatus, said spacer ring having an internal diameter corresponding to the internal diameter of the body plus the portion of the flange to be coated, said ring being provided with at least one aperture for blowing air therethrough over the surface of the flange being coated.

7. The improved apparatus as claimed in claim 6 in which said at least one aperture for air is so dimensioned that substantially no powder particles can escape therethrough to the outside.

8. The improved apparatus as claimed in claim 6 in which the spacer ring comprises an annular passage for compressed air or gas in communication with the said at least one aperture.

References Cited in the file of this patent

UNITED STATES PATENTS 1,618,540     Ligonnet _____ Feb. 22, 1927

FOREIGN PATENTS 1,051,175     Germany _____ Aug. 4, 1956